United States Patent [19]
Grafflage

[11] Patent Number: 5,156,548
[45] Date of Patent: Oct. 20, 1992

[54] DIE HAVING MAGIC SQUARES

[76] Inventor: Walter H. Grafflage, 342 W. Vista, Phoenix, Ariz. 85021

[21] Appl. No.: 573,254

[22] Filed: Aug. 24, 1990

[51] Int. Cl.⁵ .................................................. G09B 1/00
[52] U.S. Cl. ................................. 434/208; 273/153 R
[58] Field of Search ............ 434/208; 273/146, 153 S, 273/153 R, 157 R

[56] References Cited

FOREIGN PATENT DOCUMENTS 2102684  2/1983  United Kingdom ................ 273/146

OTHER PUBLICATIONS

Agostini, *Math and Logic Games,* 1980, pp. 80–81.
Berlekamp et al., *Winning Ways,* 1982, p. 778.
Ball, *Mathematical Recreations and Essays,* 1922, p. 148.
Fults, *Magic Squares,* 1974, pp. 80–81.

Primary Examiner—Richard J. Apley
Assistant Examiner—Karen Ann Richard
Attorney, Agent, or Firm—Donald J. Lisa

[57] ABSTRACT

A die or cube having different magic squares on each face. The magic squares are related so that the sums of numbers on each face pair of the three face pairs are equal to the same value.

14 Claims, 2 Drawing Sheets

| Start = 1 | | | | | Complement = 22 | | | | |
|---|---|---|---|---|---|---|---|---|---|
| 11 | 2 | 7 | 14 | 34 | 11 | 20 | 15 | 8 | 54 |
| 5 | 16 | 9 | 4 | 34 | 17 | 6 | 13 | 18 | 54 |
| 10 | 3 | 6 | 15 | 34 | 12 | 19 | 16 | 7 | 54 |
| 8 | 13 | 12 | 1 | 34 | 14 | 9 | 10 | 21 | 54 |
| 34 | 34 | 34 | 34 | 34 | 54 | 54 | 54 | 54 | 54 |

Increment 1

| Start = 2 | | | | | Complement = 22 | | | | |
|---|---|---|---|---|---|---|---|---|---|
| 12 | 3 | 8 | 15 | 38 | 10 | 19 | 14 | 7 | 50 |
| 6 | 17 | 10 | 5 | 38 | 16 | 5 | 12 | 17 | 50 |
| 11 | 4 | 7 | 16 | 38 | 11 | 18 | 15 | 6 | 50 |
| 9 | 14 | 13 | 2 | 38 | 13 | 8 | 9 | 20 | 50 |
| 38 | 38 | 38 | 38 | 38 | 50 | 50 | 50 | 50 | 50 |

Increment 1

| Start = 3 | | | | | Complement = 22 | | | | |
|---|---|---|---|---|---|---|---|---|---|
| 13 | 4 | 9 | 16 | 42 | 9 | 18 | 13 | 6 | 46 |
| 7 | 18 | 11 | 6 | 42 | 15 | 4 | 11 | 16 | 46 |
| 12 | 5 | 8 | 17 | 42 | 10 | 17 | 14 | 5 | 46 |
| 10 | 15 | 14 | 3 | 42 | 12 | 7 | 8 | 19 | 46 |
| 42 | 42 | 42 | 42 | 42 | 46 | 46 | 46 | 46 | 46 |

Increment 1

FIG. 2

DIE HAVING MAGIC SQUARES

The present invention relates to educational and recreational devices and more particularly to a die having numerals displayed in a pattern on each face which constitutes on each face a magic square.

BACKGROUND

A magic square has been defined in the literature as an array of numerals arranged in the form of a square so that the sums of the numerals in each row, each column and the two main diagonals are equal in value known as the square's constant. The number of rows and columns must be greater than two. The literature suggests that this number is commonly three or four although up to nine rows and columns are discussed in books such as New Recreations With Magic Squares by Benson and Jacoby, 1976, Dover Publications, Library of Congress Catalog Card No. 74-28909 and Magic Square by Fults, 1974, The Open Court Publishing Company with reference No. 73-23041.

In many magic squares, the numerals are consecutive numbers each used once. When the consecutive numbers start with the integer 1, the square is called a pure, or traditional, magic square. The digits in a pure magic square of the third-order can be arranged in eight ways by rotations and reflections. But a magic square which does not start with the integer 1 allows for a larger number of different arrangements, and when non-consecutive numbers are allowed, a massive number of possible arrangements exist. The literature suggests that for fourth-order magic squares exactly 880 magic square arrangements exist and that over 549,000 different orders have been found for a fifth-order magic square, although several million are believed possible.

SUMMARY OF THE INVENTION

It is an object of the present invention to provide a novel arrangement of six magic squares on a cube shaped object or die which is not only educational but of interest as a recreation device. One practical use is as a paperweight on a desk for those who are mathematically curious.

The invention has several unique features which may be embodied on the die on an individual or collective basis. Features include the fact that the magic square on each die face is different, that the square constant for each face is different but the sum of complementary numbers in aligned positions on opposite die faces is a constant value, which in the illustrated embodiment is 22. The numbers are preferably oriented so that rotation of the cube to sequentially view the numbers on opposite faces is easy for the observer.

In the illustrated embodiment, the numerals having the lowest value in each magic square are 1, 2, 3, 4, 5 and 6. The square constants for the six squares are 34, 38, 42, 46, 50 and 54 respectively. The magic squares are positioned on the die so that the squares having the lower square constants are on faces that are opposite the squares having the higher square constants. In this example, the sum of the square constants for each pair of opposite faces is made to have a constant value of 88. For other magic squares, the sum of the square constants will be different.

These and other objects of the invention will become apparent from the claims, and from the description as it proceeds in conjunction from the appended drawings

BRIEF DESCRIPTION OF DRAWINGS

FIG. 2 is a printout of six different magic squares all having consecutive integers.

DETAILED DESCRIPTION OF PREFERRED EMBODIMENT

Figure 1:
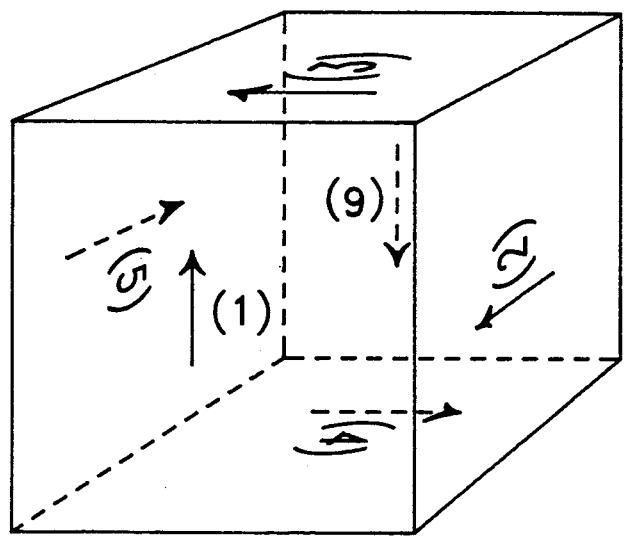
FIG. 1 is a three dimensional drawing of a cube shaped object or die with numerals identifying the six faces and arrows indicating the upright positions of the digits on each face.

FIG. 1 shows a die having a conventional shape of a six sided cube. The visible faces (1), (2) and (3) are opposite respective invisible faces (6), (5) and (4) respectively. The sum of the values of these numerals on opposite faces is 7 and is the same for all three opposite face pairs.

Figure 3:
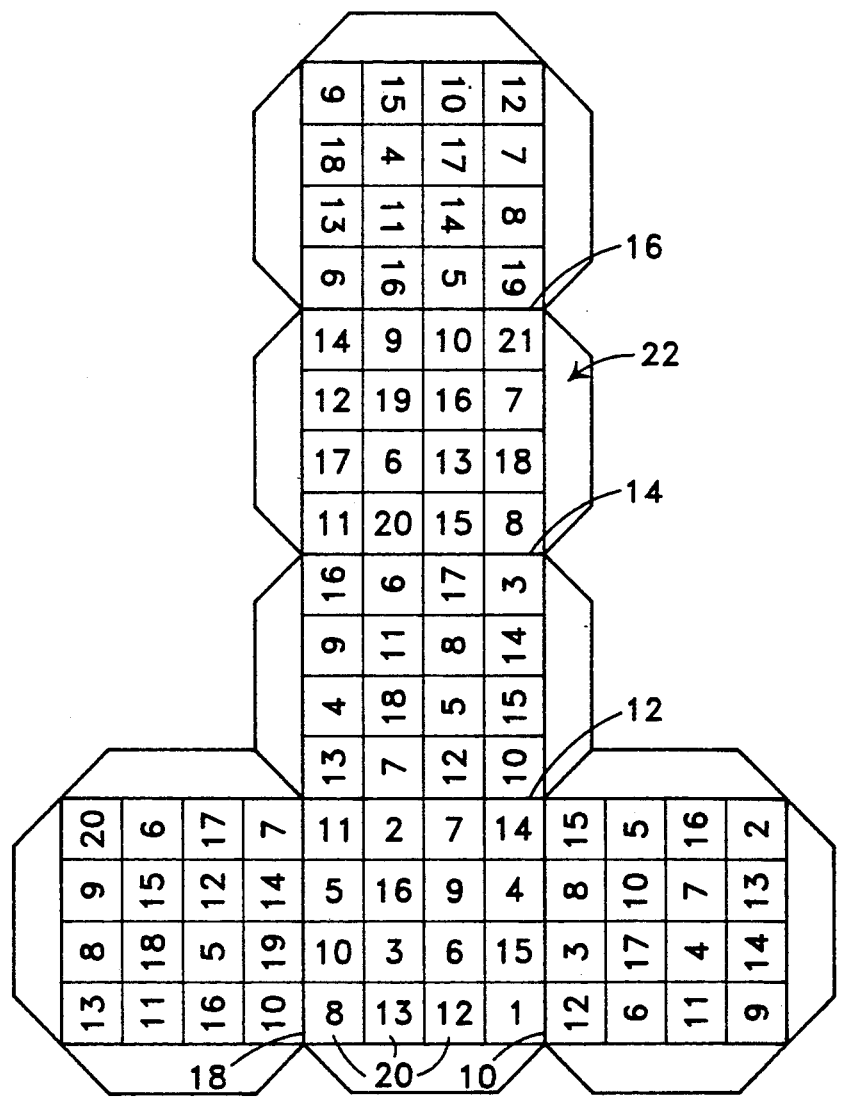
FIG. 3 is a layout of the magic square of FIG. 2 arranged for being folded along fold lines to produce a cube with opposite faces of the cube having complementary magic squares.

The present invention as applied to a die has, on each of the six faces, a number pattern which is a magic square. A magic square has a number, N, of cells that are aligned in rows and columns to form a square array In the present invention N may be any number greater than two. The various numerals that may be selected to provide a different magic square on each face is large and increases as N increases, all as explained in the prior art. The die may be a desk ornament and made of a solid material such as wood, metal, transparent plastics or the like, and the numerals formed on the face individually or on pre-printed sheets. Alternatively, a unitary blank of flat sheet material such as shown in FIG. 3 may be pre-printed and folded the overlapping edges secured together by an adhesive or the like. Each of the six faces has a different pattern of numerals forming a magic square.

In its preferred form, the numerals on different faces are chosen so that square constant on one face is different than the square constants in each of the other faces. When the square constant of one face (e.g. (1) in FIG. 1) is added to the square constant of its opposite face (e.g. (6) in FIG. 1), the sum of these square constants is equal to the sums of the square constants on faces (2) and (5) and on faces (3) and (4).

As a second feature, the smallest numeral for the magic square on each face is different. In the example illustrated in FIGS. 2 and 3, the numeral having the smallest value in each magic square is 1, 2, 3, 4, 5 or 6. The magic squares having these integer arrangements may be placed on the respective faces labeled (1) through (6) of the die shown in FIG. 1.

FIG. 2 shows the upper left square array starting with the integer 1 in the lower right hand corner. The middle square in the left column starts with the integer 2 in the lower right hand corner. The lowest square in the left hand column starts with the integer 3 in the lower right hand corner.

On the complementary square that is located lowest in the right hand column, the integer 4 has the lowest value and is positioned in the second row and second column. Its complement 18 in the left column at the corresponding position is the largest integer in that square. The sum of these two numbers is 22. Each integer in the complementary square of the right hand column when summed with the integer in the corresponding position of the companion square in the left hand column is also 22.

Moving up to the middle array in the right hand column, the integer 5 in row 2 of column 2 is the integer having the smallest value. Its complement in the middle array in the left hand column of FIG. 2 is 17 and their sum is likewise 22. The sum of each positionally aligned pair of numbers in this pair of square arrays is uniformly 22.

The same relationship holds for the complementary square arrays in the upper row of the two columns of FIG. 2. Again, the sum of each positionally aligned pair of integers is invariably 22.

With continued reference to FIG. 2, the magic square at the upper left hand corner has a square constant 34 and each other magic square has a corresponding constant sum of 38, 42, 46, 50 and 54 respectively. The magic square constant when added with the constant of its complement is 88 in each of the three pairs of magic squares. Where the number of cells in each row and column is 4 and the lowest integer progresses from 1 to 6 in the six magic squares, lowest possible constant sum of the complements is 88. Manifestly, use of multipliers or non-consecutive integers will produce a larger constant sum of the complements.

As an alternative, each integer from 1 to 96 may be used only once in the six magic squares. The increment in each square is 1 but the start numerals 1, 17, 33, 49, 65, 81 are used. All of the other features that have been described in connection with the illustrated embodiment may be incorporated in the die.

To enhance the mathematical curiosity of a cube, it is preferred to arrange the six faces to have a predetermined orientation as illustrated in FIG. 3 where a flat sheet is illustrated having fold lines 10, 12, 14, 16 and 18 which separate the six faces that can be folded to form a cube. The center of the three faces between fold lines 10 and 18 contains the integer 1 and corresponds to face (1) in FIG. 1 and the upper left square array of FIG. 2.

The face to the right of fold line 10 corresponds to face (2) in FIG. 1 and the middle left square array of FIG. 2. The smallest integer in that magic square is 2 and the integers in this square are consecutive and used only once.

The face between fold lines 12 and 14 contains as its smallest integer a 3 and corresponds to face (3) in FIG. 1 and the lowest left square array of FIG. 2.

The face above fold lines 16 contains as its smallest integer a 4 and corresponds with face (4) of FIG. 1 and the lowest right square array of FIG. 2.

The face to the left of fold line 18 contains as its smallest integer a 5 and corresponds to face (5) of FIG. 1 and the middle right square array of FIG. 2.

The magic square between lines 14 and 16 contains as its smallest integer a 6 and corresponds to face (6) of FIG. 1 and the top right square array of FIG. 2.

The orientation of the integers of opposite faces when the sheet of FIG. 3 is folded to have the form of a cube is a further feature of the present invention. The integers in faces (1) and (6) are oriented to be observer readable in a uniform position by rotation of the cube or die about an axis that is parallel to opposite faces (1) and (6) and perpendicular to the height dimension of the integers on both faces. Thus, on the flat sheet of FIG. 3, the orientation of the height dimension of the integers on faces (1) and (6) is the same. The same relationship holds true for the orientation of the height dimensions of the integers on faces (2) and (5). However, for integers on faces (3) and (4), the layout on the face corresponding to (4) requires a reversal of the orientations of the height dimensions in order that the integers will have the same observer readable relationship as its opposite face (3). This is evident from a comparison with the legends on the faces of the die illustrated in FIG. 1.

One further unique feature according to a preferred form of the invention is that the position of the integers on each face is aligned with the position of the complementary integers on its opposite face. The digits 8, 13, 12 and 1 in the bottom row 20 of the face (1) have as their complements 14, 9, 10 and 21 in the top row 22 of face (6). The sum of the individual complementary digits is invariably 22 in the illustrated example. This relationship holds for each integer pair in faces (1) and (6). The complementary integer positions may be observed to be at opposite ends of a line which extends perpendicularly between the two opposite faces (1) and (6).

Turning to faces (2) and (5), the same relationship between the integers at the complementary integer positions on opposite faces exists. And the same is true for the magic squares on faces (3) and (4). The sum of the complementary digits is always the same, namely 22.

For a simpler magic square having an order of 3, the square constants 15, 18, 21, 24, 27 and 30 may be used. A square's constant is the sum of the integers in each row, column and main diagonal. The smallest value of each integer for the six magic squares is 1, 2, 3, 4, 5 or 6 the increment is 1 and each square is different from all others.

The sum of the square constants on opposite faces of the die or cube shaped object may be selected in this example to be a constant 45 by pairing the magic squares having the smallest and largest square constants, the square having the second and fifth smallest square constants and the squares having the third and fourth smallest square constants. The sum of the square constants for each pair of magic squares on opposite faces matches to the constant sum of 45 in this example.

All of the other features discussed in connection with FIGS. 2 and 3 illustrating magic squares having an order of 4 may be attained with magic squares having an order of 3. The same is true for magic squares having an order greater than 4.

The foregoing description is illustrative and many variations and modifications will become apparent. It is intended that all variations and modifications which fall within the scope of the appended claims and equivalents thereof be covered.

I claim:

1. An educational and recreational mathematical device comprising:
   a) a die having six faces forming a cube;
   b) each face having a square pattern of numbers in columns and rows that form a magic square;
   c) each of said magic squares being characterized by having a sum of the numbers in each row, in each column and in each diagonal which are same but the sum is different from the corresponding sum in each other square whereby each magic square has a different square constant;
   d) said sum of the square constants for each pair of magic squares on opposite faces on the die providing a second sum; and
   e) the second sum for each pair of opposite faces being the same.

2. The device of claim 1 wherein the number having the smallest value in each magic square is different for each cube face and opposite face pairs are selected by the size of the number having the smallest value with the faces having the smallest and the largest of said smallest value numbers forming a first opposite face pair, the faces having the second smallest and fifth smallest value numbers forming a second opposite face pair and the faces having the third smallest and fourth smallest value numbers forming a third opposite face pair.

3. The device of claim 2 wherein the numbers having the smallest value in each magic square are 1, 2, 3, 4, 5 or 6 respectively, and the second sum for each pair of opposite faces is 88.

4. The device of claim 1 wherein the number at a first position in any face summed with the number at a corresponding position in the face opposite thereto is equal to a constant value for each position in each pair of opposite faces on the die.

5. The device of claim 4 where corresponding positions are aligned along parallel lines extending perpendicular to the opposite faces.

6. The device of claim 5 wherein the numbers having the smallest value in each magic square are 1, 2, 3, 4, 5 or 6 respectively, and the constant value is 22.

7. The device of claim 1 wherein the orientation of numbers on opposite faces is such that the numbers are observer readable in a uniform position by rotation of the die about an axis that is in a plane that is parallel to planes of said opposite faces and perpendicular to a height dimension of the numbers on both of said opposite faces.

8. The device of claim 7 wherein the positions of the numbers in any face are aligned with positions of complementary numbers on an opposite faces, said alignment being along parallel lines extending perpendicular to the opposite faces, the sums of said complementary numbers all being equal for each opposite face pair for all three face pairs.

9. The device of claim 8 wherein the sum of each of said complementary numbers on the die is 22.

10. The device of claim 1 wherein the die is formed from a flat sheet material that is pre-printed with six magic squares and folded to have the shape of a cube.

11. The device of claim 1 wherein the die is formed from a block of solid material and the numbers are applied to the face of said material.

12. An educational and recreational mathematical device comprising:
  a) a die having six faces forming a cube;
  b) each face having a square pattern of numbers in columns and rows that form a magic square;
  c) each of said magic squares being characterized by having a sum of the numbers in each row, in each column and in each diagonal which are same but the sum is different from the corresponding sum in each other square whereby each magic square has a different square constant;
  d) the orientation of numbers on opposite faces of said die is such that the numbers are observer readable in a uniform position by rotation of the die about an axis that is in a plane that is parallel to planes of said opposite faces and perpendicular to a height dimension of the numbers on both faces.

13. The device of claim 12 wherein the die is formed from a flat sheet material that is pre-printed with six magic squares and folded to have the shape of a cube.

14. The device of claim 12 wherein the die is formed from a block of solid material and the numbers are applied to the face of said material.

* * * * *